United States Patent
Sloane et al.

(10) Patent No.: US 11,087,323 B2
(45) Date of Patent: Aug. 10, 2021

(54) EXPOSURE BASED SECURE ACCESS SYSTEM

(71) Applicant: BANK OF AMERICA CORPORATION, Charlotte, NC (US)

(72) Inventors: Brandon Sloane, Santa Barbara, CA (US); Michael Thomas Malarkey, Waxhaw, NC (US); John Brian Costello, Long Beach, CA (US); Brian Diederich, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 6 days.

(21) Appl. No.: 16/107,386

(22) Filed: Aug. 21, 2018

(65) Prior Publication Data

US 2020/0065811 A1    Feb. 27, 2020

(51) Int. Cl.
*G06Q 20/40* (2012.01)
*G06Q 20/06* (2012.01)

(52) U.S. Cl.
CPC ......... *G06Q 20/4014* (2013.01); *G06Q 20/06* (2013.01)

(58) Field of Classification Search
CPC .... G06Q 20/4014; G06Q 20/06; G06Q 20/00; G06Q 20/02; G06Q 20/04; G06Q 20/0425; G06Q 20/065; G06Q 20/0652; G06Q 20/0655; G06Q 20/0658; G06Q 20/08; G06Q 20/085; G06Q 20/0855; G06Q 20/12; G06Q 20/127; G06Q 20/14; G06Q 20/145; G06Q 20/20; G06Q 20/22; G06Q 20/227;

(Continued)

(56) References Cited

U.S. PATENT DOCUMENTS 5,134,496 A   7/1992  Schwab et al.
5,315,448 A   5/1994  Ryan
(Continued)

FOREIGN PATENT DOCUMENTS

WO   199321586 A1   10/1993
WO   199511560 A1    4/1995
(Continued)

*Primary Examiner* — Namrata Boveja
*Assistant Examiner* — Divesh Patel
(74) *Attorney, Agent, or Firm* — Michael A. Springs; Moore & Van Allen PLLC; Anup Shrinivasan Iyer (57) ABSTRACT

Systems, computer program products, and methods are described herein for regulating exposure based secured access is presented. The present invention is configured to receive, from a user computing device, a request to access a network device to execute one or more actions, wherein the user computing device is associated with a payment token; receive information associated with the one or more actions, wherein the information comprises an exposure level; initiate an authorization module associated with the distributed network environment; determine, using the authorization module, a token amount to execute the one or more actions; automatically retrieve, from the user computing device, the token amount from the payment token; authorize the user computing device to access the network device to execute the one or more actions; and access and update a blockchain distributed ledger based on information associated with the request and subsequent authorization to access the network device.

16 Claims, 2 Drawing Sheets

(58) Field of Classification Search
CPC .. G06Q 20/356; G06Q 20/363; G06Q 20/367; G06Q 20/3672; G06Q 20/3674; G06Q 20/38; G06Q 20/382; G06Q 20/3821; G06Q 20/38215; G06Q 20/3823; G06Q 20/40; G06Q 20/401; G06Q 30/0207; G06Q 30/0219; G06Q 30/0222; G06Q 30/0223; G06Q 30/0224; G06Q 30/0225; G06Q 30/0226; G06Q 30/0227; G06Q 30/0231; G06Q 30/0232; G06Q 30/0235; G06Q 2220/00; G06Q 2220/12

See application file for complete search history.

(56) References Cited

U.S. PATENT DOCUMENTS

| | | | |
|---|---|---|---|
| 5,421,013 | A | 5/1995 | Smith |
| 6,009,170 | A | 12/1999 | Sako et al. |
| 6,272,283 | B1 | 8/2001 | Nguyen |
| 6,314,518 | B1 | 11/2001 | Linnartz |
| 6,351,439 | B1 | 2/2002 | Miwa et al. |
| 6,606,450 | B1 | 8/2003 | Klebanoy et al. |
| 6,643,330 | B1 | 11/2003 | Nakagawa et al. |
| 6,664,976 | B2 | 12/2003 | Lofgren et al. |
| 6,785,814 | B1 | 8/2004 | Usami et al. |
| 6,985,410 | B1 | 1/2006 | Furukawa et al. |
| 7,088,823 | B2 | 8/2006 | Fetkovich |
| 7,098,931 | B2 | 8/2006 | Patterson et al. |
| 9,275,204 | B1* | 3/2016 | Orr ................. G06F 21/30 |
| 10,015,795 | B1* | 7/2018 | Wolf ................. H04L 67/36 |
| 2002/0030907 | A1 | 3/2002 | Ikeda et al. |
| 2002/0131595 | A1 | 9/2002 | Ueda et al. |
| 2003/0185125 | A1 | 10/2003 | Sako |
| 2003/0215110 | A1 | 11/2003 | Rhoads et al. |
| 2003/0235125 | A1 | 12/2003 | Akita |
| 2004/0008866 | A1 | 1/2004 | Rhoads et al. |
| 2004/0046774 | A1 | 3/2004 | Rhoads et al. |
| 2004/0114907 | A1 | 6/2004 | Rinaldi |
| 2004/0136536 | A1 | 7/2004 | Michtchenko |
| 2005/0271364 | A1 | 12/2005 | Collar |
| 2006/0026627 | A1 | 2/2006 | Yang et al. |
| 2006/0168630 | A1 | 7/2006 | Davies |
| 2007/0033360 | A1 | 2/2007 | Kori et al. |
| 2007/0039039 | A1* | 2/2007 | Gilbert ................. G06F 21/6218 726/4 |
| 2008/0101679 | A1 | 5/2008 | Rauh et al. |
| 2008/0260199 | A1 | 10/2008 | Cowburn |
| 2008/0312952 | A1 | 12/2008 | Gulfo et al. |
| 2009/0010550 | A1 | 1/2009 | Chang et al. |
| 2014/0282965 | A1* | 9/2014 | Sambamurthy ......... G06F 21/31 726/7 |
| 2015/0254650 | A1* | 9/2015 | Bondesen .......... G06Q 20/3674 705/67 |
| 2015/0254663 | A1* | 9/2015 | Bondesen ............ G06Q 20/405 705/44 |
| 2017/0091765 | A1* | 3/2017 | Lloyd .................. G06Q 20/321 |
| 2017/0220793 | A1* | 8/2017 | Birgisson ................ G06F 21/45 |
| 2019/0165932 | A1* | 5/2019 | Vincent ................ G06Q 20/065 |

FOREIGN PATENT DOCUMENTS

| | | |
|---|---|---|
| WO | 199515635 A1 | 6/1995 |
| WO | 2005098832 A2 | 10/2005 |

\* cited by examiner

EXPOSURE BASED SECURE ACCESS SYSTEM

FIELD OF THE INVENTION

The present invention embraces a system for exposure based access within the realm of a distributed network environment.

BACKGROUND

Access management describes the management of individual identities, their authentication, authorization, roles and privileges within or across system and enterprise boundaries with the goal of increasing security and productivity while decreasing cost, downtime, and repetitive tasks. There is a need for a system that distinguishes exposure levels between various access requests, determine popularity of the access requests, and determine, effectively, which of the access requests misuse their access.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for regulating exposure based secured access is presented. The system comprising: at least one non-transitory storage device; and at least one processing device coupled to the at least one non-transitory storage device, wherein the at least one processing device is configured to: receive, from a user computing device associated with a user, a request to access a network device within a distributed network environment to execute one or more actions, wherein the user computing device is associated with a payment token; receive information associated with the one or more actions, wherein the information comprises an exposure level; initiate an authorization module associated with the distributed network environment; determine, using the authorization module, a token amount to execute the one or more actions; automatically retrieve, from the user computing device, the token amount from the payment token; authorize the user computing device to access the network device to execute the one or more actions; and access a blockchain distributed ledger, associated with the authorization module, stored in the at least one non-transitory storage device, wherein the blockchain distributed ledger is updated based on information associated with the request and subsequent authorization to access the network device.

In some embodiments, the request further comprises information associated with one or more applications stored on the network device and wherein the user wishes to execute the one or more actions on the one or more applications.

In some embodiments, the at least one processing device is further configured to determine an exposure level associated with each of the one or more actions; and determine the token amount based on at least the exposure level associated with each of the one or more actions.

In some embodiments, the at least one processing device is further configured to: determine, using the authorization module, an authentication level required to execute the one or more actions on the network device; receive, from the user computing device, one or more authentication credentials associated with the user; validate the one or more authentication credentials to determine whether the one or more authentication credentials of the user matches the authentication level required to execute the one or more actions on the network device; and authorize the user computing device to access the network device to execute the one or more actions based on at least determining that the one or more authentication credentials of the user matches the authentication level required to execute the one or more actions on the network device.

In some embodiments, the at least one processing device is further configured to associate the payment token with one or more source of funds associated with the user.

In some embodiments, the at least one processing device is further configured to authorize the user computing device to access the network device to execute the one or more actions, wherein authorizing further comprises authorizing the user computing device to access the network device for a predetermined time period.

In some embodiments, the predetermined time period is based on at least the exposure level associated with each of the one or more actions.

In some embodiments, the at least one processing device is further configured to: receive, from the user computing device, a request to execute a second action on the network device during a first predetermined time period where the user is executing a first action; determine that a second exposure level associated with the second action is higher than a first exposure level associated with the first action; determine a portion of a first token amount remaining based on amount of time remaining in the first predetermined time period; determine a second token amount to execute the second action, wherein the second token amount is based on at least the portion of the first token amount remaining; and determine a second predetermined time period for the user to execute the second action based on at least the second token amount.

In some embodiments, the at least one processing device is further configured to: automatically, from the user computing device, the second token amount from the payment token; and authorize the user computing device to access the network device to execute the second action.

In some embodiments, the at least one processing device is further configured to: communicate the information associated with the request and subsequent authorization to access the network device, to one or more authorization modules associated with one or more network devices in the distributed network environment to be validated.

In some embodiments, the at least one processing device is further configured to: generate the blockchain distributed ledger based on at least information associated with one or more requests from one or more users to access one or more network devices within the distributed network environment.

In another aspect, a computer program product for regulating exposure based secured access is presented. The computer program product comprising a non-transitory computer-readable medium comprising code causing a first apparatus to: receive, from a user computing device associated with a user, a request to access a network device within a distributed network environment to execute one or more actions, wherein the user computing device is associated with a payment token; receive information associated with the one or more actions, wherein the information comprises an exposure level; initiate an authorization module associated with the distributed network environment; determine, using the authorization module, a token amount to execute the one or more actions; automatically retrieve, from the user computing device, the token amount from the payment token; authorize the user computing device to access the network device to execute the one or more actions; and access a blockchain distributed ledger, associated with the authorization module, stored in at least one non-transitory storage device, wherein the blockchain distributed ledger is updated based on information associated with the request and subsequent authorization to access the network device.

In yet another aspect, a computer implemented method for regulating exposure based secured access is presented. The method comprising: receiving, from a user computing device associated with a user, a request to access a network device within a distributed network environment to execute one or more actions, wherein the user computing device is associated with a payment token; receiving, using a computing device processor, information associated with the one or more actions, wherein the information comprises an exposure level; initiating, using a computing device processor, an authorization module associated with the distributed network environment; determining, using the authorization module, a token amount to execute the one or more actions; automatically retrieving, from the user computing device, the token amount from the payment token; authorizing, using a computing device processor, the user computing device to access the network device to execute the one or more actions; and accessing, using a computing device processor, a blockchain distributed ledger, associated with the authorization module, stored in at least one non-transitory storage device, wherein the blockchain distributed ledger is updated based on information associated with the request and subsequent authorization to access the network device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

Figure 1:
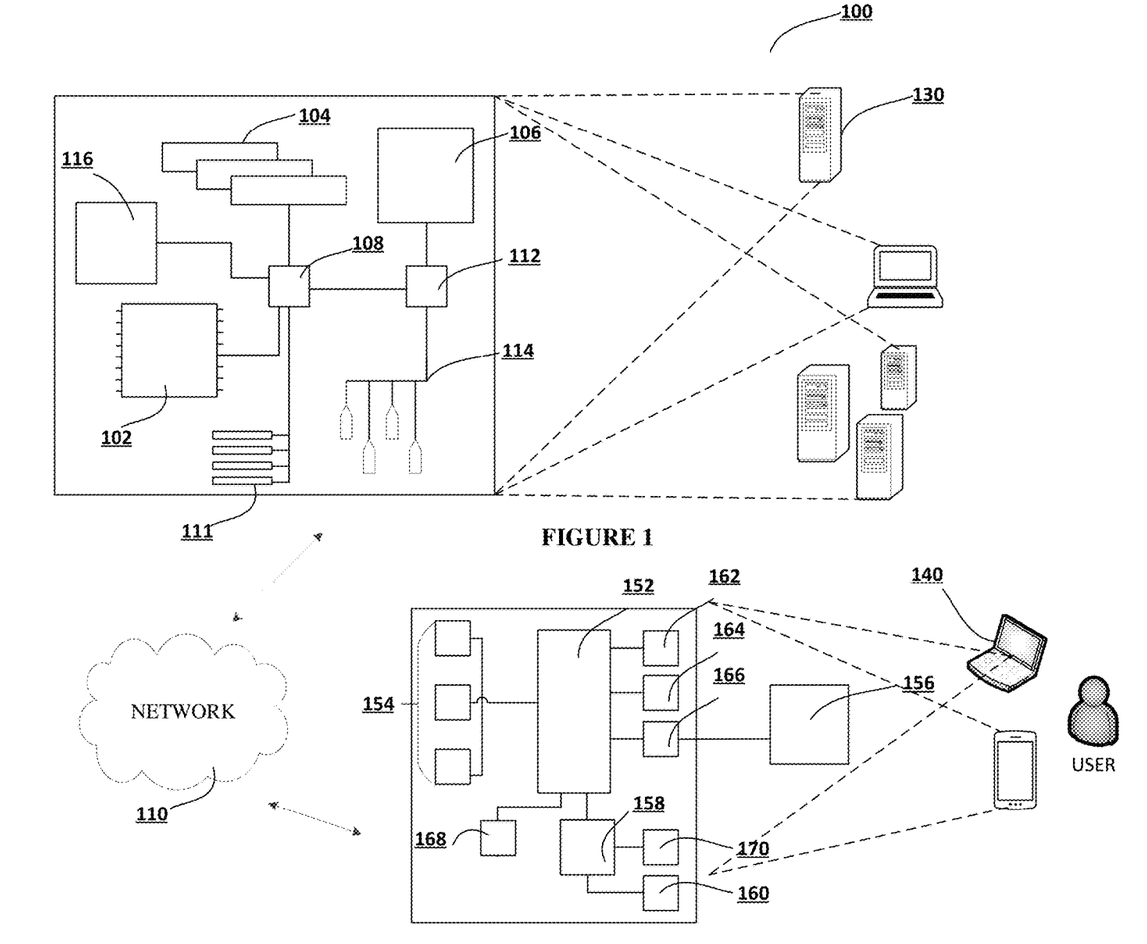
FIG. 1 illustrates technical components of a system for regulating exposure based secured access, in accordance with an embodiment of the invention.

FIG. 1 presents an exemplary block diagram of the system environment for regulating exposure based secured access 100, in accordance with an embodiment of the invention. FIG. 1 provides a unique system that includes specialized servers and system communicably linked across a distributive network of nodes required to perform the functions of the process flows described herein in accordance with embodiments of the present invention. In this regard, the present invention is directed to systems, methods, and computer program products that improve the access management protocol within a distributed network environment. Accordingly, the present invention implements an unconventional solution of blockchain technology to retrieve access logs from authentication modules within the distributed network environment and facilitates the creation and maintenance of the blockchain distributed ledger to be updated independently by each authentication module within the network. This architecture allows for a new dexterity as a system of record that goes beyond being a simple database.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Decentralized access logging makes it difficult to gain a holistic view into what entities are doing with their access (when they use it, what they do, how long they require it, or the like). The present invention provides the functional benefit of using blockchain technology to transform access management into a financial transaction. Blockchain is a distributed ledger that maintains a list of records, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. The data records recorded in the blockchain are encrypted and stored on the nodes of the blockchain. A blockchain provides numerous advantages over traditional databases. A large number of nodes of a blockchain may reach a consensus regarding the validity of a transaction contained on the transaction ledger.

The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business and blocks are created by users known as "miners" who use specialized software/equipment to create blocks. Users of the blockchain create transactions that are passed around to various nodes of the blockchain. A "valid" transaction is one that can be validated based on a set of rules that are defined by the particular system implementing the blockchain. Any of the nodes can validate a transaction, add the transaction to its copy of the blockchain, and/or broadcast the transaction, its validation (in the form of a block) and/or other data to other nodes.

Various other specific-purpose implementations of blockchains have been developed. These include distributed domain name management, decentralized crowd-funding, synchronous/asynchronous communication, decentralized real-time ride sharing and even a general purpose deployment of decentralized applications. In some embodiments, a blockchain may be characterized as a public blockchain, a consortium blockchain, or a private blockchain. In this regard, the public blockchain is a blockchain that anyone in the world can read, anyone in the world can send transactions to and expect to see them included if they are valid, and anyone in the world can participate in the consensus process. The consensus process is a process for determining which of the blocks get added to the chain and what the current state each block is. Typically, public blockchains are secured by crypto economics—the combination of economic incentives and cryptographic verification using mechanisms such as proof of work, following a general principle that the degree to which someone can have an influence in the consensus process is proportional to the quantity of economic resources that they can bring to bear. A public blockchain is generally considered to be fully decentralized.

In some embodiments, a consortium blockchain is a blockchain where the consensus process is controlled by a pre-selected set of nodes, each of which operate in such a way that the at least 10 (say) node must sign every block in order for the block to be valid. The right to read such a blockchain may be public, or restricted to the participants. These blockchains may be considered partially decentralized. In still other embodiments, fully private blockchains is a blockchain whereby permissions are kept centralized with one entity. The permissions may be public or restricted to an arbitrary extent.

The present invention provides the functional benefit of identifying authorization modules which grant access to entities (often users) within a distributed network environment on a regular basis. These authorization modules are characterized as "sellers" of the access. Examples of authentication modules include, but are not limited to, active directories, service providers, identity providers, Web services, access control, digital identities, password managers, single sign-on, security tokens, security token services (STS), workflows, and/or the like. Different types of access may be priced based on relative exposure to the entity. In some embodiments, the types of access that entities tend to limit are priced higher than others. For example, in authorization modules such as active directories, any sort of domain rights would be priced significantly higher than basic rights. These key systems add to their authorization processes the requirement of a successful transaction on the access management block-chain. The requesting entity must purchase their access and have it published on the transaction ledger prior to the key system granting authorization.

In some embodiments, the system may be configured to establish token amounts for the various computing devices that request access that have predetermined price amounts. These token amounts may be implemented using a ticket system established by the entities providing the access in support of the access management blockchain. In one aspect, the system may be configured to establish infinite token amounts, thereby not imposing any sort of limitations on the access. Since all authorization transactions are still processed through a decentralized transaction ledger, the system may be configured to aggregate information associated with each entity requesting access. In another aspect, the system may be configured to establish token amounts as a way of restricting rights to privileged access. Based on the pricing model established by the entities based on exposure, entities that engage in activity with high exposure on a regular basis would require significant token amounts to perform their functions.

Figure 2:
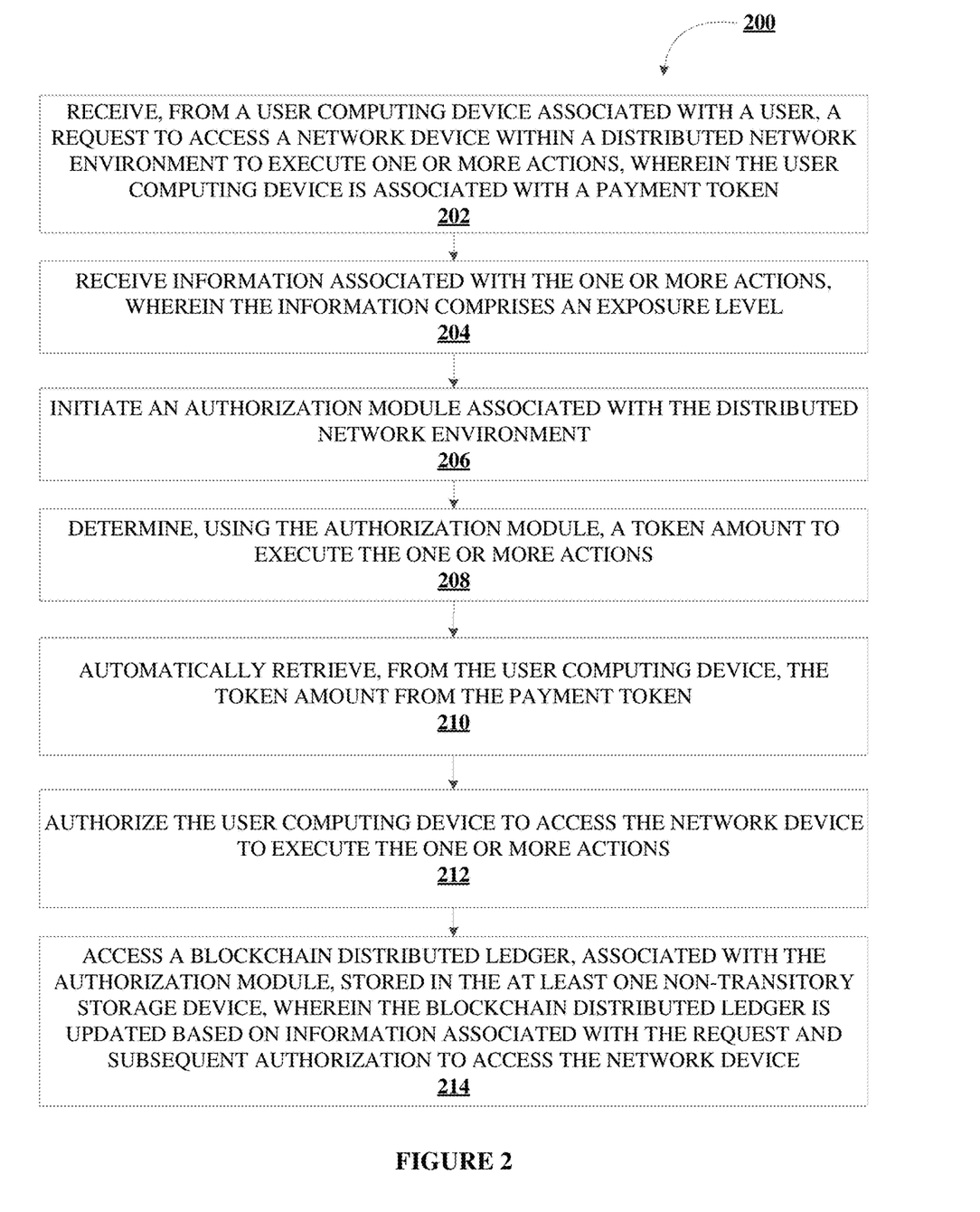
FIG. 2 illustrates a process flow for regulating exposure based secured access, in accordance with an embodiment of the invention.

FIG. 2 illustrates a process flow for regulating exposure based secured access 200, in accordance with an embodiment of the invention. As shown in block 202, the process flow includes receiving, from a user computing device associated with a user, a request to access a network device within a distributed network environment to execute one or more actions, wherein the user computing device is associated with a payment token. In some embodiments, the user may be associated with an entity different from the entity associated with the distributed network environment. In some other embodiments, the user may be associated with the entity that is associated with the distributed network environment. In one aspect, the request may include information associated with one or more applications stored on the network device and wherein the user wishes to execute the one or more actions on the one or more applications. For example, an action may include, but is not limited to, initiating the application on the network device, accessing one or more features on the one or more applications, deleting the one or more applications, and/or the like. In another aspect, the request may include information associated with one or more hardware devices associated with the network device and wherein the user wishes to execute the one or more actions on the one or more hardware devices associated with the network device. For example, an action may include, but is not limited to, disabling a hardware device, enabling a disabled hardware device, establishing a communication link between multiple hardware devices, updating software for the hardware devices, and/or the like.

In some embodiments, the system may be configured to associate the payment token with one or more source of funds associated with the user. In this regard, the payment token may include code therein that includes a virtual image of the card, card number, CVV number, expiration data, and other disclosures of the card required to utilize the card for digital wallet transactions. As such, the payment token may be stored in the memory of the user computing system and subsequently decrypted to be used by the user computing system as a payment means via a digital wallet. The token may also be stored and decrypted by the entity providing the access for reconciliation and processing of the transaction post digital wallet transaction.

Next, as shown in block 204, the process flow includes receiving information associated with the one or more actions, wherein the information comprises an exposure level. In some embodiments, the system may be configured to determine, using the authorization module, an authentication level required to execute the one or more actions on the network device. In response, the system may be configured to receive, from the user computing device, one or more authentication credentials associated with the user. Once the system receives the authentication credentials, they are then validated to determine whether the authentication credentials of the user matches the authentication level required to execute the one or more actions on the network device. In response, the system may be configured to authorize the user computing device to access the network device to execute the actions based on determining that the authentication credentials of the user matches the authentication level required to execute the actions on the network device.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted. For instance, the authentication continuum may range from "zero authentication," which requires no authentication credentials, to "hard authentication," which requires the strictest combination of credentials. In between the two extremes, "a soft authentication" requires minimal credentials, moderate credentials or most credentials for various points along the continuum. The continuum generally represents the number of credentials required, type of credentials, and/or the relative strength of the credentials required for that point on the continuum. In one aspect, the continuum of authentication may be couples with application functions permitted. Functions may typically refer to what a user is permitted to "see" and/or what the user is permitted to "do". More specifically, this may refer to whether a specific function is permitted at a certain point on the continuum and/or the context in which a certain function is permitted. For instance, the functions permitted may range from "no functions are permitted" to "all functions are permitted." In between the extremes, minimal functions are permitted, moderate functions are permitted and most functions are permitted. Thus, any given point along the continuum corresponds with a certain amount and/or number of functions that are permitted and/or the context in which certain functions are permitted.

Accordingly, one continuum (authentication or function) may be moved left or right with respect to the other continuum in order to achieve a different relationship between the functions permitted and the credentials required. Accordingly, for a given coupling, a specific point on continuum provides that a particular function or functions may be permitted given that a specified level of authentication credentials are supplied, as indicated by the corresponding point on continuum. For example, a financial institution and/or a user may arrange the continua and with respect to one another and may adjust the arrangement based on changing desires or goals. In some embodiments, one or both the continua and may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

In some embodiments, the system may be configured to provide access to the user computing device for a predetermined period of time. In this regard, the predetermined period of time may be based on the exposure level associated with each of the one or more actions. In one aspect, the predetermined period of time associated with the access to the network device for execution an action may be higher for actions with higher exposure level. In another aspect, the predetermined period of time for access to the network device for execution of an action may not be higher for actions with higher exposure level.

Next, as shown in block 206, the process flow includes initiating an authorization module associated with the distributed network environment. In one aspect, the authorization module is configured to receive authentication information from the user, process the authentication credentials to determine the rights and privileges of the user, and determine whether the user may access the network device and/or a combination of functions within the network device.

Next, as shown in block 208, the process flow includes determining, using an authorization module, a token amount from the payment token. In some embodiments, the system may be configured to determine the token amount based on at least the exposure level associated with the one or more actions. In one aspect, the higher the exposure level of action, the higher the token amount required to execute such an action. In this regard, the system may be configured to assign predetermined token amounts to each action such that when the user requests access to the network device to execute the action, the system may be configured to request a token amount accordingly. In some embodiments, the exposure level may be determined by aggregating the exposure level of each action the user wishes to execute on the network device. In some other embodiments, the system may be configured to determine the token amount based on at least the number of functions permitted within each application based on the user's authentication level. In this regard, each function within an application may be associated with a predetermined exposure level, with each predetermined exposure level being associated with a token amount. Accordingly, the token amount may be an aggregate of token amounts associated with each function the user wishes to access within the application.

Next, as shown in block 210, the process flow includes automatically retrieving, from the user computing device, the token amount from the payment token. As described herein, the payment token may be stored in the memory of the user computing system and subsequently decrypted to be used by the user computing system as a payment means via a digital wallet. In some embodiments, the system may be configured to require a user authorization to retrieve the token amount from the payment token. In this regard, the system may be configured to initiate a user interface for display on the user computing device. The user interface may include the token amount and the payment token listed under the user's name. In one aspect, the user interface may also include an option for the user to authorize the retrieval of the token amount from the payment token. In response to receiving the user input, the system may be configured to retrieve the payment amount from the payment token.

Next, as shown in block 212, the process flow includes authorizing the user to access the network device to execute the one or more actions. In this regard, the system may be configured to establish a communication link between the user computing device and the network device to enable the user to execute the one or more actions.

Next, as shown in block 214, the process flow includes accessing a blockchain distributed ledger, associated with the authorization module, stored in the at least one non-transitory storage device, wherein the blockchain distributed ledger is updated based on information associated with the request and subsequent authorization to access the network device. In some embodiments, the system may be configured to communicate the information associated with the request and subsequent authorization to access the network device, to one or more authorization modules associated with one or more network devices in the distributed network environment to be validated. As described herein, the one or more authorization modules may validate the access transaction based on a predetermined set of rules that are defined by the particular entity implementing the blockchain. In one aspect, the blockchain distributed ledger is generated based on at least information associated with one or more requests from one or more users to access one or more network devices within the distributed network environment. The distributed ledger is stored within each authentication module associated with the distributed network environment, thereby establishing an access log capable of representing a holistic view of various computing devices accessing the computing network environment.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for regulating exposure based secured access, the system comprising:
   at least one non-transitory storage device; and
   at least one processing device coupled to the at least one non-transitory storage device, wherein the at least one processing device is configured to:
   receive, from a user computing device associated with a user, a request to access a network device within a distributed network environment to execute one or more actions, wherein the user computing device is associated with a payment token, wherein the request further comprises information associated with one or more hardware devices associated with the network device and wherein the user wishes to execute the one or more actions on the one or more hardware devices, wherein the one or more actions comprises at least establishing a communication link between the one or more hardware devices, disabling at least one of the one or more hardware devices, and/or enabling at least one of the one or more hardware devices;
   receive information associated with the one or more actions, wherein the information comprises an exposure level;
   initiate an authorization module associated with the distributed network environment;
   determine, using the authorization module, a token amount to execute the one or more actions, wherein determining further comprises:
      determining an exposure level associated with each of the one or more actions; and
      determining a predetermined time period for access to the one or more hardware devices associated with the network device to execute the one or more actions based on at least the exposure level associated with each of the one or more actions;
   automatically retrieve, from the user computing device, the token amount from the payment token;
   receive, from the user computing device, one or more authentication credentials associated with the user; and
   update a blockchain distributed ledger, associated with the authorization module, stored in the at least one non-transitory storage device, wherein the blockchain distributed ledger is updated based on information associated with the request and subsequent authorization to access the network device, wherein updating further comprises:
      communicating the information associated with the request and subsequent authorization to access the network device to one or more other authorization modules associated with one or more network devices in the distributed network environment to be validated;
      receiving, from the one or more other authorization modules, an indication that the information associated with the request and subsequent authorization to access the network device is valid based on at least a set of rules associated with the blockchain distributed ledger; and
      updating the blockchain distributed ledger with the information associated with the request and subsequent authorization to access the network based on at least receiving the indication that the information associated with the request and subsequent authorization to access the network device is valid; and
   authorize the user computing device to access the network device to execute the one or more actions after the blockchain distributed ledger is updated based on at least determining that the one or more authentication credentials of the user matches an authentication level required to execute the one or more actions on the network device, wherein authorizing further comprises authorizing the user computing device to access the network device for the predetermined time period.

2. The system of claim 1, wherein the at least one processing device is further configured to:
   determine an exposure level associated with each of the one or more actions; and
   determine the token amount based on at least the exposure level associated with each of the one or more actions.

3. The system of claim 1, wherein the at least one processing device is further configured to:
   determine, using the authorization module, an authentication level required to execute the one or more actions on the network device;
   validate the one or more authentication credentials to determine whether the one or more authentication credentials of the user matches the authentication level required to execute the one or more actions on the network device; and
   authorize the user computing device to access the network device to execute the one or more actions based on at least determining that the one or more authentication credentials of the user matches the authentication level required to execute the one or more actions on the network device.

4. The system of claim 1, wherein the at least one processing device is further configured to associate the payment token with one or more source of funds associated with the user.

5. The system of claim 1, wherein the at least one processing device is further configured to:
   receive, from the user computing device, a request to execute a second action on the network device during a first predetermined time period where the user is executing a first action;
   determine that a second exposure level associated with the second action is higher than a first exposure level associated with the first action;
   determine a portion of a first token amount remaining based on amount of time remaining in the first predetermined time period;
   determine a second token amount to execute the second action, wherein the second token amount is based on at least the portion of the first token amount remaining; and
   determine a second predetermined time period for the user to execute the second action based on at least the second token amount.

6. The system of claim 5, wherein the at least one processing device is further configured to:
   automatically retrieving, from the user computing device, the second token amount from the payment token; and
   authorize the user computing device to access the network device to execute the second action.

7. The system of claim 1, wherein the at least one processing device is further configured to:
generate the blockchain distributed ledger based on at least information associated with one or more requests from one or more users to access one or more network devices within the distributed network environment.

8. A computer program product for regulating exposure based secured access, the computer program product comprising a non-transitory computer-readable medium comprising code causing a first apparatus to:
receive, from a user computing device associated with a user, a request to access a network device within a distributed network environment to execute one or more actions, wherein the user computing device is associated with a payment token, wherein the request further comprises information associated with one or more hardware devices associated with the network device and wherein the user wishes to execute the one or more actions on the one or more hardware devices, wherein the one or more actions comprises at least establishing a communication link between the one or more hardware devices, disabling at least one of the one or more hardware devices, and/or enabling at least one of the one or more hardware devices;
receive information associated with the one or more actions, wherein the information comprises an exposure level;
initiate an authorization module associated with the distributed network environment;
determine, using the authorization module, a token amount to execute the one or more actions, wherein determining further comprises:
determining an exposure level associated with each of the one or more actions; and
determining a predetermined time period for access to the one or more hardware devices associated with the network device to execute the one or more actions based on at least the exposure level associated with each of the one or more actions;
automatically retrieve, from the user computing device, the token amount from the payment token;
receive, from the user computing device, one or more authentication credentials associated with the user; and
update a blockchain distributed ledger, associated with the authorization module, stored in the at least one non-transitory storage device, wherein the blockchain distributed ledger is updated based on information associated with the request and subsequent authorization to access the network device, wherein updating further comprises:
communicating the information associated with the request and subsequent authorization to access the network device to one or more other authorization modules associated with one or more network devices in the distributed network environment to be validated;
receiving, from the one or more other authorization modules, an indication that the information associated with the request and subsequent authorization to access the network device is valid based on at least a set of rules associated with the blockchain distributed ledger; and
updating the blockchain distributed ledger with the information associated with the request and subsequent authorization to access the network based on at least receiving the indication that the information associated with the request and subsequent authorization to access the network device is valid; and
authorize the user computing device to access the network device to execute the one or more actions after the blockchain distributed ledger is updated based on at least determining that the one or more authentication credentials of the user matches an authentication level required to execute the one or more actions on the network device, wherein authorizing further comprises authorizing the user computing device to access the network device for the predetermined time period.

9. The computer program product of claim 8, wherein the first apparatus is further configured to:
determine an exposure level associated with each of the one or more actions; and
determine the token amount based on at least the exposure level associated with each of the one or more actions.

10. The computer program product of claim 8, wherein the first apparatus is further configured to:
determine, using the authorization module, an authentication level required to execute the one or more actions on the network device;
validate the one or more authentication credentials to determine whether the one or more authentication credentials of the user matches the authentication level required to execute the one or more actions on the network device; and
authorize the user computing device to access the network device to execute the one or more actions based on at least determining that the one or more authentication credentials of the user matches the authentication level required to execute the one or more actions on the network device.

11. The computer program product of claim 8, wherein the first apparatus is further configured to associate the payment token with one or more source of funds associated with the user.

12. The computer program product of claim 8, wherein the first apparatus is further configured to:
receive, from the user computing device, a request to execute a second action on the network device during a first predetermined time period where the user is executing a first action;
determine that a second exposure level associated with the second action is higher than a first exposure level associated with the first action;
determine a portion of a first token amount remaining based on amount of time remaining in the first predetermined time period;
determine a second token amount to execute the second action, wherein the second token amount is based on at least the portion of the first token amount remaining; and
determine a second predetermined time period for the user to execute the second action based on at least the second token amount.

13. A computer implemented method for regulating exposure based secured access, the method comprising:
receiving, from a user computing device associated with a user, a request to access a network device within a distributed network environment to execute one or more actions, wherein the user computing device is associated with a payment token, wherein the request further comprises information associated with one or more hardware devices associated with the network device and wherein the user wishes to execute the one or more actions on the one or more hardware devices, wherein the one or more actions comprises at least establishing a communication link between the one or more hardware devices, disabling at least one of the one or more hardware devices, and/or enabling at least one of the one or more hardware devices;

receiving, using a computing device processor, information associated with the one or more actions, wherein the information comprises an exposure level;

initiating, using a computing device processor, an authorization module associated with the distributed network environment;

determining, using the authorization module, a token amount to execute the one or more actions, wherein determining further comprises:
  determining an exposure level associated with each of the one or more actions; and
  determining a predetermined time period for access to the one or more hardware devices associated with the network device to execute the one or more actions based on at least the exposure level associated with each of the one or more actions;

automatically retrieving, from the user computing device, the token amount from the payment token;

receive, from the user computing device, one or more authentication credentials associated with the user; and updating, using a computing device processor, a blockchain distributed ledger, associated with the authorization module, stored in at least one non-transitory storage device, wherein the blockchain distributed ledger is updated based on information associated with the request and subsequent authorization to access the network device, wherein updating further comprises:
  communicating the information associated with the request and subsequent authorization to access the network device to one or more other authorization modules associated with one or more network devices in the distributed network environment to be validated;
  receiving, from the one or more other authorization modules, an indication that the information associated with the request and subsequent authorization to access the network device is valid based on at least a set of rules associated with the blockchain distributed ledger; and
  updating the blockchain distributed ledger with the information associated with the request and subsequent authorization to access the network based on at least receiving the indication that the information associated with the request and subsequent authorization to access the network device is valid; and authorizing, using a computing device processor, the user computing device to access the network device to execute the one or more actions after the blockchain distributed ledger is updated based on at least determining that the one or more authentication credentials of the user matches an authentication level required to execute the one or more actions on the network device, wherein authorizing further comprises authorizing the user computing device to access the network device for the predetermined time period.

14. The computer implemented method of claim 13, wherein the computer implemented method further comprises:
  determining an exposure level associated with each of the one or more actions; and
  determining the token amount based on at least the exposure level associated with each of the one or more actions.

15. The computer implemented method of claim 13, wherein the computer implemented method further comprises:
  determining, using the authorization module, an authentication level required to execute the one or more actions on the network device;
  validating the one or more authentication credentials to determine whether the one or more authentication credentials of the user matches the authentication level required to execute the one or more actions on the network device; and
  authorizing the user computing device to access the network device to execute the one or more actions based on at least determining that the one or more authentication credentials of the user matches the authentication level required to execute the one or more actions on the network device.

16. The system of claim 1, wherein the at least one processing device is further configured to:
  receive, from the user computing device associated with the user, the request to access the network device to the execute one or more actions, wherein the request further comprises information associated with one or more applications stored on the network device and wherein the user wishes to execute the one or more actions on the one or more applications.

* * * * *